(12) United States Patent
Murata et al.

(10) Patent No.: US 10,767,247 B2
(45) Date of Patent: Sep. 8, 2020

(54) ALUMINUM ALLOY MAGNETIC DISK SUBSTRATE AND METHOD FOR PRODUCING SAME

(71) Applicants: UACJ CORPORATION, Tokyo (JP); FURUKAWA ELECTRIC CO., LTD., Tokyo (JP)

(72) Inventors: Takuya Murata, Tokyo (JP); Kotaro Kitawaki, Tokyo (JP); Makoto Yonemitsu, Tokyo (JP); Naoki Kitamura, Tokyo (JP); Takashi Nakayama, Tokyo (JP); Hideyuki Hatakeyama, Tokyo (JP); Ryo Sakamoto, Tokyo (JP); Sadayuki Toda, Tokyo (JP)

(73) Assignees: UACJ Corporation, Tokyo (JP); Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 16/482,113

(22) PCT Filed: Jan. 30, 2018

(86) PCT No.: PCT/JP2018/002912
§ 371 (c)(1),
(2) Date: Jul. 30, 2019

(87) PCT Pub. No.: WO2018/143177
PCT Pub. Date: Aug. 9, 2018

(65) Prior Publication Data
US 2019/0390304 A1 Dec. 26, 2019

(30) Foreign Application Priority Data
Feb. 1, 2017 (JP) .................... 2017-016944

(51) Int. Cl.
*G11B 5/73* (2006.01)
*G11B 5/84* (2006.01)
(Continued)

(52) U.S. Cl.
CPC ............... *C22C 21/00* (2013.01); *C22F 1/04* (2013.01); *C23C 18/1689* (2013.01);
(Continued)

(58) Field of Classification Search
None
See application file for complete search history.

(56) References Cited

U.S. PATENT DOCUMENTS

| | | | | |
|---|---|---|---|---|
| 6,037,051 A | * | 3/2000 | Kakuta | G11B 5/70615 428/328 |
| 2017/0327930 A1 | * | 11/2017 | Kitawaki | G11B 5/7315 |

(Continued)

FOREIGN PATENT DOCUMENTS

| | | |
|---|---|---|
| JP | 04143292 A | 5/1992 |
| JP | 05247659 A | 9/1993 |

(Continued)

OTHER PUBLICATIONS

ISR issued in Int'l. application No. PCT/JP2018/002912, dated Mar. 20, 2018.

(Continued)

*Primary Examiner* — Kevin M Bernatz
(74) *Attorney, Agent, or Firm* — Greer Burns & Crain Ltd.

(57) ABSTRACT

There are provided: an aluminum alloy magnetic disk substrate including: an aluminum alloy base material including an aluminum alloy containing 0.4 to 3.0 mass % (hereinafter, simply referred to as "%") of Fe, 0.1 to 3.0% of Mn, 0.005 to 1.000% of Cu, and 0.005 to 1.000% of Zn, with the balance of Al and unavoidable impurities; and an electroless
(Continued)

Ni—P plated layer formed on a surface of the aluminum alloy base material, in which the peak value (BLEI) of Fe emission intensity at an interface between the electroless Ni—P plated layer and the aluminum alloy base material, as determined by a glow discharge optical emission spectrometry device, is lower than Fe emission intensity (AlEI) in the interior of the aluminum alloy base material, as determined by the glow discharge optical emission spectrometry device; and a method for producing the aluminum alloy magnetic disk substrate.

7 Claims, 2 Drawing Sheets

(51) Int. Cl.
| | |
|---|---|
| *C22C 21/00* | (2006.01) |
| *C22F 1/04* | (2006.01) |
| *C23C 18/16* | (2006.01) |
| *C23C 18/18* | (2006.01) |
| *C23C 18/32* | (2006.01) |
| *C23F 1/20* | (2006.01) |

(52) U.S. Cl.
CPC .......... *C23C 18/18* (2013.01); *C23C 18/1827* (2013.01); *C23C 18/32* (2013.01); *C23F 1/20* (2013.01); *G11B 5/73919* (2019.05); *G11B 5/8404* (2013.01)

(56) References Cited

U.S. PATENT DOCUMENTS

| | | | |
|---|---|---|---|
| 2018/0190316 A1* | 7/2018 | Kitawaki | ............. G11B 5/7315 |
| 2019/0066724 A1* | 2/2019 | Nakamura | ................ C22F 1/04 |
| 2019/0172487 A1* | 6/2019 | Kitawaki | .................. C22C 1/02 |

FOREIGN PATENT DOCUMENTS

| | | |
|---|---|---|
| JP | 2006063438 A | 3/2006 |
| JP | 5872322 A | 3/2016 |
| WO | 2016068293 A1 | 5/2016 |

OTHER PUBLICATIONS

Japanese Office Action issued in corresponding JP application No. 2018-525624, dated Sep. 28, 2018 (with translation).
Decision to Grant issued in corresponding JP application No. 2018-525624, dated Oct. 23, 2018 (with translation).

* cited by examiner

ALUMINUM ALLOY MAGNETIC DISK SUBSTRATE AND METHOD FOR PRODUCING SAME

This is a National Phase Application filed under 35 U.S.C. § 371, of International Application No. PCT/JP2018/002912, filed Jan. 30, 2018, the contents of which are incorporated by reference.

TECHNICAL FIELD

The present disclosure relates to an aluminum alloy magnetic disk substrate, and specifically relates to an aluminum alloy magnetic disk substrate with low disk flutter and reduced defects on an electroless Ni—P plated surface and a method for producing the aluminum alloy magnetic disk substrate.

BACKGROUND ART

Aluminum alloy magnetic disk substrates used in storage devices for computers and data centers are produced using substrates that have favorable plating properties and that are excellent in mechanical characteristics and workability. For example, the aluminum alloy magnetic disk substrates are produced from substrates based on an aluminum alloy according to JIS 5086 (including 3.5 mass % or more and 4.5 mass % or less of Mg, 0.50 mass % or less of Fe, 0.40 mass % or less of Si, 0.20 mass % or more and 0.70 mass % or less of Mn, 0.05 mass % or more and 0.25 mass % or less of Cr, 0.10 mass % or less of Cu, 0.15 mass % or less of Ti, and 0.25 mass % or less of Zn with the balance of Al and unavoidable impurities).

Common magnetic disks made of aluminum alloys are produced by first producing an annular aluminum alloy substrate, plating the aluminum alloy substrate, and then depositing a magnetic substance on a surface of the aluminum alloy substrate.

For example, a magnetic disk made of an aluminum alloy, including the MS 5086 alloy, is produced by the following production steps. First, an aluminum alloy allowed to contain desired chemical components is cast to obtain an ingot, and the ingot is subjected to homogenization treatment, then to hot rolling, and then to cold rolling, to produce a rolled material having a thickness required for the magnetic disk. It is preferable to anneal the rolled material in the cold rolling and/or the like as needed. Then, the rolled material is stamped to obtain aluminum alloy sheets having an annular shape. In order to eliminate distortion and/or the like occurring in the previous production steps, the aluminum alloy sheets having the annular shape obtained by stamping the rolled material are layered, and the resultant is subjected to pressurization annealing in which the resultant is flattened by annealing the resultant while pressurizing both top and under surfaces of the resultant. As a result, an annular aluminum alloy disk blank is produced.

The disk blank produced in such a manner is subjected in turn to cutting work, grinding work, degreasing treatment, etching treatment, desmutting treatment, and zincate treatment (Zn substitution treatment) as pretreatment. Then, the disk blank is subjected to electroless plating with Ni—P which is a rigid non-magnetic metal as undercoat treatment, and a plated surface of the disk blank is flattened by polishing, followed by sputtering a magnetic substance, to produce the magnetic disk made of an aluminum alloy.

In recent years, the environment enveloping HDDs has been in the process of great change. The larger capacities, higher densities, and, in addition, speedup of the HDDs have become necessary for the larger storage capacities of data centers, caused by development of cloud service, and for competition with SSDs which have been new storage devices. For the large capacities of the HDDs, it is effective to increase the number of magnetic disks placed in a storage device. Thus, thinned aluminum alloy base materials for magnetic disks have been demanded. However, the thinned aluminum alloy base materials for magnetic disks result in a decrease in rigidity, and in an increase in exciting force due to an increase in fluid force in high-speed rotation caused by the speedup, thereby causing a problem of occurrence of disk flutter. The disk flutter occurs because high-speed rotation of magnetic disks causes unstable airflow to be generated between the disks, and the airflow results in vibration (fluttering) of the magnetic disks. The disk flutter is considered to occur because the low rigidity of an aluminum alloy base material results in the increased vibration of the magnetic disks, and a head which is a reader is incapable of following such a variation. The occurrence of fluttering results in an increase in the positioning error of the head. Therefore, reduction in disk flutter has been earnestly demanded.

For the larger capacities of the HDDs, it is also effective to increase a storage capacity per magnetic disk. The presence of defects such as pits on an electroless Ni—P-plated surface results in the necessity of reading and writing data in portions other than the peripheries of the defects. As a result, a storage capacity per magnetic disk is decreased in proportion to the number of the defects. As described above, a decrease in defects on an electroless Ni—P-plated surface is essential for increasing a storage capacity.

In light of such actual circumstances, an aluminum alloy magnetic disk substrate having both characteristics of reducing disk flutter and decreasing defects on an electroless Ni—P plated surface has been earnestly desired in recent times. For example, a conventionally used Al—Mg-based alloy according to JIS 5086 or the like is incapable of achieving a decrease in disk flutter. For decreasing the disk flutter, it is effective to distribute a compound in an aluminum alloy, and therefore, it is necessary to examine an alloy type that has not been examined until now. However, since the number of defects on an electroless Ni—P plated surface is increased with increasing the amount of a compound in an aluminum alloy, measures to reduce the contents of Fe and Si have been taken for conventional aluminum alloy base materials. For satisfying both the characteristics of reducing disk flutter and decreasing defects on an electroless Ni—P plated surface, it is necessary to solve the two contradictory problems.

For example, Patent Literature 1 discloses the composition of an aluminum alloy base material to which a large amount of Si is added in order to reduce disk flutter. Patent Literature 2 discloses a technology of suppressing plating defects by adding sulfate ions to washing water in an electroless Ni—P plating step.

In the aluminum alloy substrate disclosed in Patent Literature 1, however, grinding work is precluded because a large amount of Si is added to the aluminum alloy substrate, and, in addition, it is difficult to remove Si on a surface of the aluminum alloy substrate, whereby it is impossible to solve a problem in that the number of defects on an electroless Ni—P plated surface is increased. The technology of Patent Literature 2 is a technology that exhibits an effect in the case of an aluminum alloy substrate with a small amount of a compound, and therefore, the effect is unexpectable when a compound is dispersed to reduce disk flutter.

CITATION LIST

Patent Literature

PTL 1: International Publication No. WO 2016/068293
PTL 2: Japanese Patent No. 5872322

SUMMARY OF INVENTION

Technical Problem

The present disclosure was made under such actual circumstances with an objective to provide an aluminum alloy magnetic disk substrate with low disk flutter and reduced defects on an electroless Ni—P plated surface and a method for producing the aluminum alloy magnetic disk substrate.

Solution to Problem

The present inventors repeated intensive research on a relationship between a compound in an aluminum alloy base material and disk flutter, and on a property of removing the compound. As a result, it was found that the addition of Fe in the composition of the aluminum alloy base material can result in a reduction in disk flutter. Further, it was also found that the compound in the aluminum alloy base material to which Fe is added can be easily removed in a compound removal step, and defects on an electroless Ni—P plated surface can be reduced. While repeating the research, the present inventors accomplished a technology that solves two contradictory problems in that the compound is dispersed to reduce the disk flutter and the defects on the electroless Ni—P plated surface are reduced, and thus accomplished the present disclosure.

In other words, claim 1 of the present disclosure describes an aluminum alloy magnetic disk substrate including: an aluminum alloy base material including an aluminum alloy containing 0.4 to 3.0 mass % of Fe, 0.1 to 3.0 mass % of Mn, 0.005 to 1.000 mass % of Cu, and 0.005 to 1.000 mass % of Zn, with a balance of Al and unavoidable impurities; and an electroless Ni—P plated layer formed on a surface of the aluminum alloy base material, wherein a maximum value (BLEI) of Fe emission intensity in a range of 50 to 84% of Al emission intensity in an interior of the aluminum alloy base material, at an interface between the electroless Ni—P plated layer and the aluminum alloy base material, as determined by a glow discharge optical emission spectrometry device, is lower than Fe emission intensity (AlEI) in the aluminum alloy base material, as determined by the glow discharge optical emission spectrometry device.

Claim 2 of the present disclosure describes that BLEI/AlEI is 0.9 or less in a relationship between BLEI and AlEI, in accordance with claim 1.

Claim 3 of the present disclosure describes that a density of a compound present in a region from a surface, closer to the interface, of the aluminum alloy base material to a depth of 1 μm in a thickness direction is 20000 particles/mm$^2$ or less, in accordance with claim 1 or 2.

Claim 4 of the present disclosure describes that the aluminum alloy further includes one or more selected from 0.1 to 0.4 mass % of Si, 0.1 to 3.0 mass % of Ni, 0.1 to 6.0 mass % of Mg, 0.01 to 1.00 mass % of Cr, and 0.01 to 1.00 mass % of Zr, in accordance with any one of claims 1 to 3.

Claim 5 of the present disclosure describes that the aluminum alloy further includes one or more selected from Ti, B, and V, of which a total content is 0.005 to 0.500 mass %, in accordance with any one of claims 1 to 4.

Claim 6 of the present disclosure describes a method for producing the aluminum alloy magnetic disk substrate according to any one of claims 1 to 5, the method including: a step of preparing an aluminum alloy sheet, including subjecting the aluminum alloy to a casting stage, a hot-rolling stage, and a cold-rolling stage in an order mentioned above; a step of preparing the aluminum alloy base material, including subjecting an annular aluminum alloy sheet obtained by stamping the aluminum alloy sheet to have an annular shape to a pressurization flattening annealing stage, a cutting/grinding work stage, and a strain-removing heat treatment stage in an order mentioned above; a plating pretreatment step including subjecting the aluminum alloy base material to an alkaline degreasing treatment stage, an acid-etching treatment stage, a desmutting treatment stage, and a zincate treatment stage in an order mentioned above; and an electroless Ni—P plating treatment step of performing electroless Ni—P plating treatment of a surface of the aluminum alloy base material subjected to the plating pretreatment step, wherein the method for producing the aluminum alloy magnetic disk substrate further includes a compound removal step of performing immersion for 5 to 60 seconds in a mixed solution of HNO$_3$/HF that is 10 to 60 mass % HNO$_3$ solution at 10 to 30° C. and contains 10 to 80 g/L of HF, after the cutting/grinding work stage and before the zincate treatment stage.

Claim 7 of the present disclosure describes that either or both of a homogenization treatment stage between the casting stage and the hot-rolling stage and an annealing treatment stage before or in the cold-rolling stage are further included, in accordance with claim 6.

Advantageous Effects of Invention

The aluminum alloy magnetic disk substrate according to the present disclosure has features of reduced disk flutter and decreased defects on an electroless Ni—P plated surface. As a result, there can be provided a magnetic disk that enables the number of such placed magnetic disks to be increased due to thinning of the magnetic disk, enables a storage capacity per magnetic disk to be increased, and contributes to the higher capacity of an HDD.

DESCRIPTION OF EMBODIMENTS

The present disclosure will be described in detail below with reference to embodiments. Features of the present disclosure are that inclusion of a compound removal step enables the improvement of the plating property of an aluminum alloy magnetic disk substrate in which a compound is dispersed by addition of Fe in order to reduce disk flutter. The effects and detailed mechanisms of such features will be described below.

1. Plating Pretreatment

Figure 1:
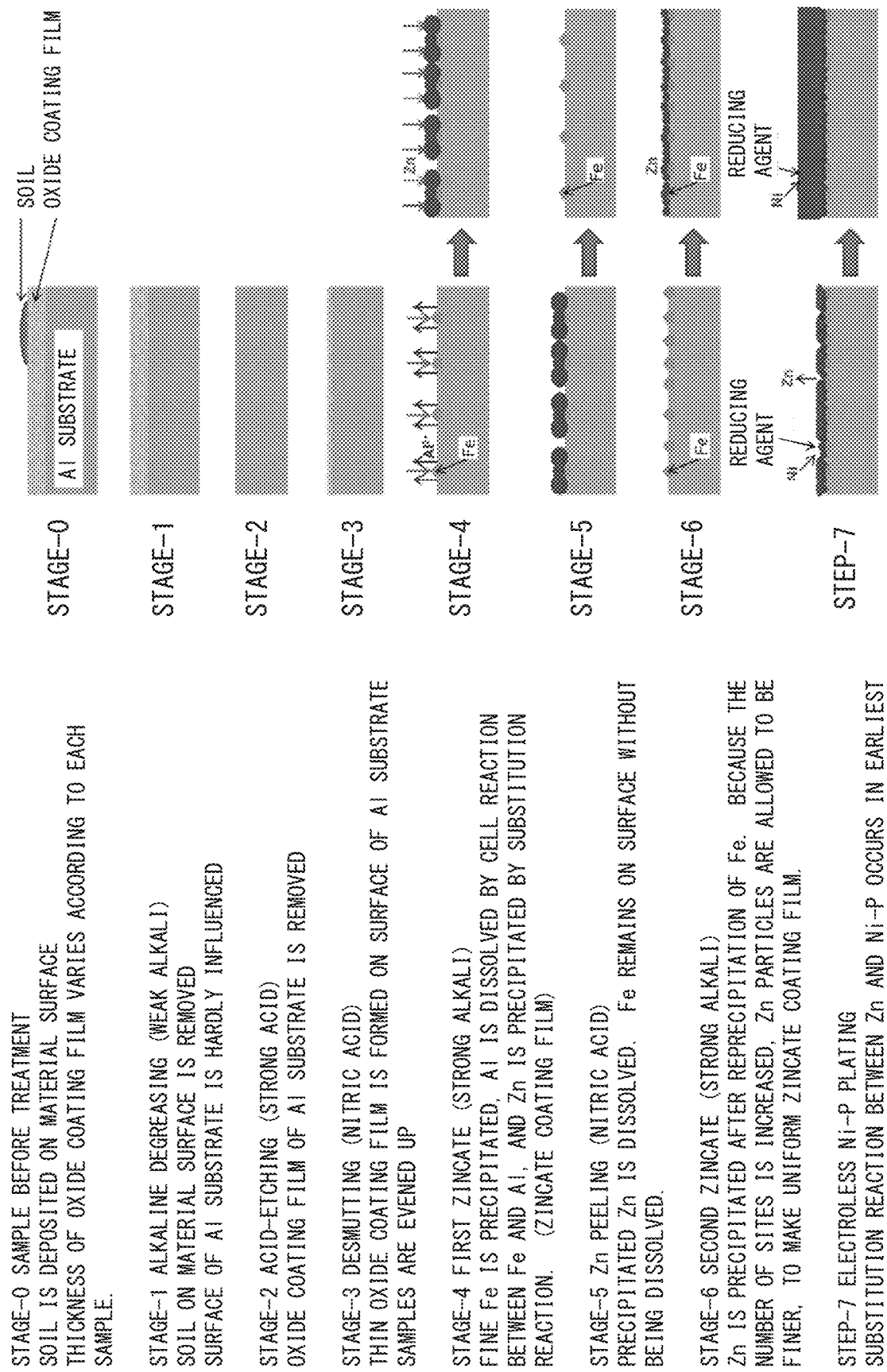
FIG. 1 is an explanatory diagram of steps of the plating pretreatment and electroless Ni—P plating of an aluminum alloy magnetic disk substrate.

FIG. 1 illustrates a step of plating pretreatment in an aluminum alloy magnetic disk substrate. A sample prior to treatment in Stage-0 is in the state of being obtained by subjecting an annular disk blank of an aluminum alloy base material to pressurization flattening annealing, then to cutting work and grinding work, and further to strain-removing heat treatment. Soil is deposited on a surface of the sample prior to the treatment, and the thickness of an oxide coating film varies according to each sample.

Then, the soil deposited on the material surface is removed in the stage of alkaline degreasing treatment in Stage-1. The oxide coating film on a surface of the aluminum alloy base material is removed in the stage of acid-etching treatment in Stage-2. In the stage of desmutting treatment in Stage-3, a thin oxide coating film is generated on the surface of the aluminum alloy base material to allow the thickness of the oxide coating film of each sample to be approximately invariant. In the stages described above, the surface of each aluminum alloy base material is uniformly adjusted.

Then, in the stage of first zincate in Stage-4, fine Fe is precipitated on the surface of the aluminum alloy base material, the aluminum alloy base material is then dissolved by cell reaction between Fe and the aluminum alloy base material, and Zn is precipitated by substitution reaction (zincate coating film). In the stage of peeling of Zn in Stage-5, Zn precipitated in Stage-4 is dissolved to allow Fe to remain. In the stage of second zincate in Stage-6, the same reaction as that in the stage of first zincate occurs; however, reprecipitation of Fe results in the increased number of the origins of cell reaction, thereby allowing precipitated Zn to be fine to form a uniform zincate coating film. In the final step of electroless Ni—P plating as Step-7, substitution reaction between Zn and Ni—P on the surface of the aluminum alloy base material first proceeds, and Ni—P is precipitated on Ni—P by autocatalytic reaction when the surface is covered with Ni—P.

2. Compound Removal Step

In the acid-etching stage in the above Stage-2, only etching power is exhibited to such an extent that the oxide coating film on the surface of the aluminum alloy substrate is removed, and a small amount of matrix is dissolved. In a conventional aluminum alloy base material with a very small amount of added Fe and Si, defects on an electroless Ni—P plated surface are not influenced because a compound is removed by such an acid-etching stage due to the small compound and the low presence density of the compound.

However, since the aluminum alloy magnetic disk substrate with reduced disk flutter according to the present disclosure contains Fe and therefore includes a large compound, of which the presence density is high. Accordingly, in the acid-etching stage, it is impossible to finish removal of the compound, and the compound remains on the surface of the aluminum alloy base material, thereby increasing defects on the electroless Ni—P plated surface. For reducing the defects on the electroless Ni—P plated surface, it is necessary to reduce the compound remaining on the surface of the aluminum alloy base material, and therefore, a compound removal step is necessarily included. Herein, the compound in the present disclosure refers to an intermetallic compound such as Al—Fe or Al—Fe—Mn.

In the compound removal step, the compound remaining on the surface of the aluminum alloy base material is removed by a chemical liquid. A mixed solution of $HNO_3$/HF that is 10 to 60 mass % (hereinafter abbreviated as "%") $HNO_3$ solution at 10 to 30° C. and contains 10 to 80 g/L of HF (hereinafter, simply abbreviated as "mixed solution") is used as the chemical liquid used. The mixed solution has high etching power and increases the rate of dissolution of the aluminum alloy base material particularly around the compound. The dissolution of the aluminum alloy base material around the compound results in the removal of the compound, thereby enabling the selective removal of only the compound on the surface of the aluminum alloy base material.

When the concentration of HF is less than 10 g/L and the concentration of $HNO_3$ is less than 10% in the mixed solution described above, etching power is low, and it is impossible to sufficiently remove the compound on the surface of the aluminum alloy base material. In contrast, when the concentration of HF is more than 80 g/L and the concentration of $HNO_3$ is more than 60%, etching power is too high, and the dissolution of the matrix of the aluminum alloy base material proceeds. As a result, recesses and projections on the surface of the aluminum alloy base material are enlarged, whereby it is impossible to obtain the smoothness of the electroless Ni—P plated surface. The concentration of HF is preferably 20 to 60 g/L, and the concentration of $HNO_3$ is preferably 25 to 50%.

The temperature of the mixed solution is set at 10 to 30° C. When the temperature is less than 10° C., a reaction rate is low, and it is impossible to sufficiently remove the compound on the surface of the aluminum alloy base material. In contrast, when the temperature is more than 30° C., a reaction rate is too high, and the dissolution of the matrix of the aluminum alloy base material proceeds, thereby enlarging recesses and projections on the surface of the aluminum alloy base material. The temperature of the mixed solution is preferably 15 to 25° C. Further, treatment time in the compound removal step is set at 5 to 60 seconds. When the treatment time is less than 5 seconds, reaction time is too short, and it is impossible to sufficiently remove the compound on the surface of the aluminum alloy base material. In contrast, when the treatment time is more than 60 seconds, reaction time is too long, and the dissolution of the matrix of the aluminum alloy base material proceeds, thereby enlarging recesses and projections on the surface of the aluminum alloy base material. The treatment time is preferably 10 to 30 seconds.

The compound removal step is performed after the stage of the cutting/grinding work and before a zincate treatment stage. For example, the compound removal step may be performed before the first zincate stage and after the desmutting stage in Stage-3, in FIG. 1, or may be performed instead of the desmutting stage. Further, for example, the compound removal step may be performed after the stage of the cutting/grinding work and before the alkaline degreasing treatment stage in Stage-1. In such a case, the oxide coating film on the surface of the aluminum alloy base material may be removed by establishing the same stage as the acid-etching stage in Stage-2 before the compound removal step.

3. Alloy Composition of Aluminum Alloy Base Material

The alloy composition of the aluminum alloy base material used in the aluminum alloy magnetic disk substrate according to the present disclosure includes 0.4 to 3.0 mass % (hereinafter abbreviated as "%") of Fe, 0.1 to 3.0% of Mn, 0.005 to 1.000% of Cu, and 0.005 to 1.000% of Zn as essential elements, with the balance of Al and unavoidable impurities. In addition, one or more selected from 0.1 to 0.4% of Si, 0.1 to 3.0% of Ni, 0.1 to 6.0% of Mg, 0.01 to 1.00% of Cr, and 0.01 to 1.00% of Zr may be further included as first selective elements. In addition, one or more selected from Ti, B, and V, in a total content of 0.005 to 0.500%, may be further included as second selective elements.

Fe: 0.4 to 3.0%

Fe exists principally as second phase particles (Al—Fe-based compound or the like), exists to be partly solid-dissolved in a matrix, and has the effect of improving the strength and fluttering characteristic of the aluminum alloy magnetic disk substrate. Application of vibrations to such a magnetic disk substrate results in immediate absorption of vibrational energy due to viscous flow in the interface between the second phase particles and the matrix to obtain a very high fluttering characteristic.

An Fe content of less than 0.4% results in the insufficient strength and fluttering characteristic of the magnetic disk substrate. In contrast, an Fe content of more than 3.0% results in generation of a large number of the particles of a coarse Al—Fe-based compound. Although even the coarse Al—Fe-based compound can be removed in the compound removal step, large recesses are formed after the removal of the compound, thereby resulting in the deterioration of the smoothness of the electroless Ni—P plated surface and in peeling of plating. Accordingly, the content of Fe is set in a range of 0.4 to 3.0%. The content of Fe is preferably in a range of 0.8 to 1.8%.

Mn: 0.1 to 3.0%

Mn exists principally as second phase particles (Al—Mn-based compound or the like) and has the effect of improving the strength and fluttering characteristic of the magnetic disk substrate. Application of vibrations to such a magnetic disk substrate results in immediate absorption of vibrational energy due to viscous flow in the interface between the second phase particles and the matrix to obtain a very high fluttering characteristic.

A Mn content of less than 0.1% results in the insufficient strength and fluttering characteristic of the magnetic disk substrate. In contrast, a Mn content of more than 3.0% results in generation of a large number of the particles of a coarse Al—Mn-based compound. Although even the coarse Al—Mn-based compound can be removed in the compound removal step, large recesses are formed after the removal of the compound, thereby resulting in the deterioration of the smoothness of the electroless Ni—P plated surface and in peeling of plating. Accordingly, the content of Mn is set in a range of 0.1 to 3.0%. The content of Mn is preferably in a range of 0.1 to 1.0%.

Cu: 0.005 to 1.000%

Cu exists principally as second phase particles (Al—Cu-based compound or the like) and has the effect of improving the strength and fluttering characteristic of the magnetic disk substrate. In addition, the effect of uniformly, thinly, and minutely generating a zincate coating film to improve the smoothness of electroless Ni—P plating is also exhibited.

A Cu content of less than 0.005% results in the insufficient strength and fluttering characteristic of the magnetic disk substrate and causes the zincate coating film to be nonuniform, thereby deteriorating the smoothness of electroless Ni—P plating. In contrast, a Cu content of more than 1.0% results in generation of a large number of the particles of a coarse Al—Cu-based compound. Although even the coarse Al—Cu-based compound can be removed in the compound removal step, large recesses are formed after the removal of the compound, thereby resulting in the deterioration of the smoothness of the electroless Ni—P plated surface and in peeling of plating. Accordingly, the content of Cu is set in a range of 0.005 to 1.000%. The content of Cu is preferably in a range of 0.005 to 0.400%.

Zn: 0.005 to 1.000%

Zn has the effect of uniformly, thinly, and minutely generating a zincate coating film to improve the smoothness and adhesiveness of electroless Ni—P plating. In addition, Zn forms second phase particles together with other added elements and also exhibits the effect of improving the fluttering characteristic of the magnetic disk substrate.

A Zn content of less than 0.005% allows the zincate coating film to be nonuniform, thereby deteriorating the smoothness of electroless Ni—P plating. In contrast, a Zn content of more than 1.000% causes the potential of a matrix to be too electronegative, thereby increasing the rate of the dissolution of the matrix in the compound removal step and the electroless Ni—P plating step. As a result, recesses and projections on the surface of the aluminum alloy base material are enlarged, thereby deteriorating the smoothness of the electroless Ni—P plated surface. Accordingly, the content of Zn is set in a range of 0.005 to 1.000%. The content of Zn is preferably in a range of 0.100 to 0.700%.

Si: 0.1 to 0.4%

Si exists principally as second phase particles (Si particles or the like) and has the effect of improving the strength and fluttering characteristic of the magnetic disk substrate. Application of vibrations to such a magnetic disk substrate results in immediate absorption of vibrational energy due to viscous flow in the interface between the second phase particles and the matrix to obtain a very high fluttering characteristic.

A Si content of less than 0.1% results in the insufficient strength and fluttering characteristic of the magnetic disk substrate. In contrast, a Si content of more than 0.4% results in generation of a large number of coarse Si particles. Because it is difficult to remove the coarse Si particles even in the compound removal step, the coarse Si particles remain on the surface of the aluminum alloy base material, thereby deteriorating the smoothness of the electroless Ni—P plated surface and resulting in peeling of plating. Accordingly, the content of Si is preferably set in a range of 0.1 to 0.4%. The content of Si is more preferably set in a range of 0.1 to 0.3%.

Ni: 0.1 to 3.0%

Ni exists principally as second phase particles (Al—Ni-based compound or the like) and has the effect of improving the strength and fluttering characteristic of the magnetic disk substrate. Application of vibrations to such a magnetic disk substrate results in immediate absorption of vibrational energy due to viscous flow in the interface between the second phase particles and the matrix to obtain a very high fluttering characteristic.

A Ni content of less than 0.1% results in the insufficient strength and fluttering characteristic of the magnetic disk substrate. In contrast, a Ni content of more than 3.0% results in generation of a large number of the particles of a coarse Al—Ni-based compound. Although even the coarse Al—Ni-based compound can be removed in the compound removal step, large recesses are formed after the removal of the compound, thereby resulting in the deterioration of the smoothness of the electroless Ni—P plated surface and in peeling of plating. Accordingly, the content of Ni is preferably set in a range of 0.1 to 3.0%. The content of Ni is more preferably set in a range of 0.1 to 1.0%.

Mg: 0.1 to 6.0%

Mg exists principally as second phase particles (Mg—Si-based compound or the like) and has the effect of improving the strength and fluttering characteristic of the magnetic disk substrate. A Mg content of less than 0.1% results in the insufficient strength and fluttering characteristic of the magnetic disk substrate. In contrast, a Mg content of more than 6.0% precludes rolling. Accordingly, the content of Mg is preferably set in a range of 0.1 to 6.0%. The content of Mg is more preferably set in a range of 0.3 to 1.0%.

Cr: 0.01 to 1.00%

Cr exists principally as second phase particles (Al—Cr-based compound or the like) and has the effect of improving the strength and fluttering characteristic of the magnetic disk substrate. A Cr content of less than 0.01% results in the insufficient strength and fluttering characteristic of the magnetic disk substrate. In contrast, a Cr content of more than 1.00% results in generation of a large number of the particles of a coarse Al—Cr-based compound. Although even the coarse Al—Cr-based compound can be removed in the compound removal step, large recesses are formed after the removal of the compound, thereby resulting in the deterioration of the smoothness of the electroless Ni—P plated surface and in peeling of plating. Accordingly, the content of Cr is preferably set in a range of 0.01 to 1.00%. The content of Cr is more preferably set in a range of 0.10 to 0.50%.

Zr: 0.01 to 1.00%

Zr exists principally as second phase particles (Al—Zr-based compound or the like) and has the effect of improving the strength and fluttering characteristic of the magnetic disk substrate. A Zr content of less than 0.01% results in the insufficient strength and fluttering characteristic of the magnetic disk substrate. In contrast, a Zr content of more than 1.00% results in generation of a large number of the particles of a coarse Al—Zr-based compound. Although even the coarse Al—Zr-based compound can be removed in the compound removal step, large recesses are formed after the removal of the compound, thereby resulting in the deterioration of the smoothness of the electroless Ni—P plated surface and in peeling of plating. Accordingly, the content of Zr is preferably set in a range of 0.01 to 1.00%. The content of Zr is more preferably set in a range of 0.10 to 0.50%.

Ti, B, V: 0.005 to 0.500%

Ti, B, and V have the effect of forming second phase particles (such as borides such as $TiB_2$, and $Al_3Ti$ and Ti—V—B particles), which become crystal grain nuclei, and therefore allowing crystal grains to be finer, in a solidification process in casting. The effect of suppressing nonuniformity in the sizes of the second phase particles to reduce unevenness in strength and fluttering characteristic in the magnetic disk substrate can be obtained by allowing the crystal grains to be finer. It is impossible to obtain the above-described effects when the total of the contents of Ti, B, and V is less than 0.005%. Even when the total of the contents of Ti, B, and V is more than 0.500%, the effects are saturated, and therefore, it is impossible to obtain noticeable improvement effects. Accordingly, the total of the content of V is preferably set in a range of 0.005 to 0.500%. The total of the content of V is more preferably set in a range of 0.005 to 0.100%. With regard to the total of the contents of Ti, B, and V, the total refers to the total of such three elements when all the elements are contained, the total refers to the total of only two elements of the elements when the two elements are contained, and the total refers to the total of only one element of the elements when the one element is contained.

Other Elements

The balance of the aluminum alloy base material according to the embodiment of the present disclosure consists of Al and unavoidable impurities. Example of the unavoidable impurities include Pb, Ga, and Sn, and the characteristics of the aluminum alloy substrate obtained in the present disclosure are not deteriorated when each and the total of the unavoidable impurities are less than 0.1% and less than 0.2%, respectively.

4. Interface of Electroless Ni—P Plating/Aluminum Alloy Base Material

The magnetic disk substrate according to the embodiment of the present disclosure has features on an interface between electroless Ni—P plating and an aluminum alloy base material. The features and detailed mechanisms will be described below.

4-1. Remaining of Zincate Coating Film

The reaction in the previously described electroless Ni—P plating step will be described in detail. In the earliest stage of the electroless Ni—P plating step, precipitation reaction of Ni—P occurs on an outermost surface of the zincate coating film. The precipitation reaction of Ni—P proceeds due to dissolution of Zn in the zincate coating film as driving force during exposure of the zincate coating film. Since the rate of the reaction is very high, the zincate coating film is immediately covered with Ni—P. After the surface of the zincate coating film is covered with the Ni—P, the precipitation reaction of Ni—P on the Ni—P continuously occurs, and the zincate coating film is not involved in the reaction. The zincate coating film remains on the interface between the electroless Ni—P plating and the aluminum alloy base material in such a manner. The remaining zincate coating film has a thickness of 5 to 100 nm.

4-2. Analysis by Glow Discharge Optical Emission Spectrometry Device (GDS)

When electroless Ni—P plating is applied to the aluminum alloy base material, followed by performing analysis along a thickness direction from the electroless Ni—P plated surface to the aluminum alloy base material using GDS, a difference in emission intensity of Fe on the interface between the electroless Ni—P plating and the aluminum alloy base material occurs between the presence and absence of the compound removal step.

Figure 2:
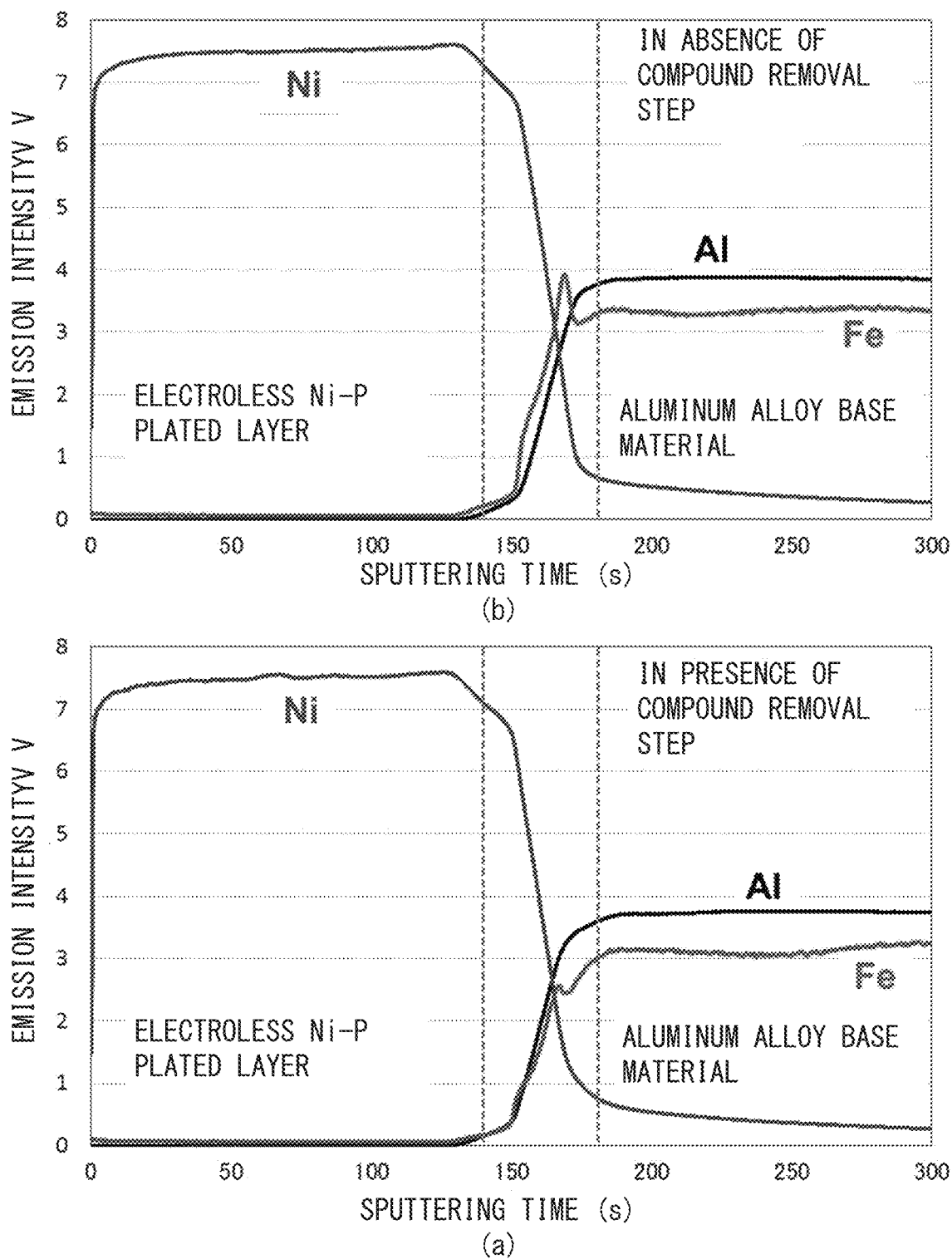
FIG. 2 is a graph indicating an example of the analysis results of an electroless Ni—P plated layer and an aluminum alloy base material in an aluminum alloy magnetic disk substrate, as determined by GDS.

An example of the analysis by GDS is illustrated in FIG. 2. In other words, the interface between the electroless Ni—P plating and the aluminum alloy base material is a portion of the remaining zincate coating film. FIG. 2 indicates a case (a) in which the compound removal step is applied, and a case (b) in which the compound removal step is not applied. In (a) or (b), a portion sandwiched between two parallel dotted lines indicates the interface, that is, the portion of the remaining zincate coating film. In addition, in (a) or (b), a more left side than the left dotted line indicates the electroless Ni—P plated layer, and a more right side than the right dotted line indicates the aluminum alloy base material. Further, in (a) or (b), the abscissa indicates a depth along the thickness direction from the electroless Ni—P surface, based on sputtering time. In contrast, the ordinate indicates emission intensity measured as a voltage by GDS.

In the present disclosure, a portion of a side, closer to the aluminum alloy base material, of the interface between the electroless Ni—P plating and the aluminum alloy base material is important. Thus, attention is focused on the maximum value (BLED of Fe emission intensity which is in a range of 50 to 84% of Al emission intensity in the interior of the aluminum alloy base material. In such a case, the interior of the aluminum alloy base material is regarded as a sputtering time range of 250 s or more. The range is a depth of 5 μm or more from the side closer to the interface of the aluminum alloy base material and was therefore judged to be sufficient for the average value in the interior of the aluminum alloy base material. In addition, the reason of the limitation to a range of 50 to 84% of Al emission intensity in the interior of the aluminum alloy base material is determined based on JIS K0146: 2002 (Surface Chemical Analysis—Sputter Depth Profiling—Optimization Using Layered Systems as Reference Materials). According to the definition, it is described that "an interface is regarded as a position at which the signal intensity of a certain element reaches 50% of a value in a film on a substrate". Thus, the position of 50% of the Al emission intensity was defined as the interface between the electroless Ni—P plating and the aluminum alloy base material, that is, the center of the remaining zincate coating film. According to the definition, it is described that depth resolution is "sputtering time for which signal intensity is changed from 16% to 84% (or from 84% to 16%) of each intensity corresponding to 100% of a film and a substrate in a single-layer structure system, or of each of layers adjacent to each other in a multi-layer structure system". Thus, the position of 84% of the Al emission intensity was defined as the outermost surface of the aluminum alloy base material.

In (b) to which the compound removal step is not applied, the maximum value of the Fe emission intensity in a range of 50 to 84% of the Al emission intensity in the aluminum alloy base material at the interface between the electroless Ni—P plating and the aluminum alloy base material is more than the emission intensity of Fe in the aluminum alloy base material. This means that the presence density of Fe at the interface is more than the presence density of Fe in the aluminum alloy base material, that is, the presence density of an Al—Fe-based compound at the interface is more than the presence density of an Al—Fe-based compound in the aluminum alloy base material. In contrast, in (a) to which the compound removal step is applied, the maximum value of the Fe emission intensity in a range of 50 to 84% of the Al emission intensity in the aluminum alloy base material at the interface is less than the emission intensity of Fe in the aluminum alloy base material. This means that the presence density of Fe at the interface is less than the presence density of Fe in the aluminum alloy base material, that is, the presence density of the Al—Fe-based compound at the interface is less than the presence density of the Al—Fe-based compound in the aluminum alloy base material.

As described above, in (b) to which the compound removal step is not applied, it is impossible to finish the removal of the Al—Fe-based compound on the surface of the aluminum alloy base material in the acid-etching step, and a new Al—Fe-based compound also appears on the surface of the aluminum alloy base material due to the dissolution of the aluminum base metal in the acid-etching step. Therefore, cell reaction between the matrix and the Al—Fe-based compounds existing on the surface of the aluminum alloy base material is promoted, thereby increasing the amount of precipitated Fe in the zincate step. As a result, the presence density of Fe, obtained by totalizing Fe in the Al—Fe-based compound that has existed since before the zincate step and Fe precipitated in the zincate step, becomes more than the presence density of Fe in the aluminum alloy base material. The Al—Fe-based compound is larger than Fe precipitated in the zincate step by several tens of times or more, and therefore remains in the state of being exposed to the surface of the aluminum alloy base material even if a zincate coating film is generated.

In contrast, in (a) to which the compound removal step is applied, the aluminum alloy base material around the Al—Fe compound is dissolved in the step, and only the compound on the surface of the aluminum alloy base material can be selectively removed. Therefore, the precipitation of Fe, which is reaction in the zincate step, proceeds only in the matrix. As a result, surplus Fe is not precipitated, and therefore, the presence density of Fe, obtained by totalizing the Al—Fe-based compound and Fe precipitated in the zincate step, becomes less than presence density of Fe in the aluminum alloy base material sheet.

When the Al—Fe-based compound remains on the surface of the aluminum alloy base material, the matrix is dissolved due to cell reaction between the Al—Fe compound and the matrix in the electroless Ni—P plating step, and defects are formed, as a path through which a gas generated in the dissolution of the matrix passes, on the electroless Ni—P plated surface. As described above, when the compound removal step is not applied, and the presence density of Fe based on the Al—Fe-based compound at the interface between the electroless Ni—P plating and the aluminum alloy base material is higher than that in the aluminum alloy base material, the number of electroless Ni—P plating defects is also increased. In other words, it was found that when the aluminum alloy base material to which the electroless Ni—P plating is applied is analyzed by GDS, and the maximum value (BLED of the Fe emission intensity in a range of 50 to 84% of the Al emission intensity in the aluminum alloy base material at the interface between the electroless Ni—P plating and the aluminum alloy base material is less than the Fe emission intensity (AlEI) in the aluminum alloy base material, the number of plating defects can also be determined to be small. With regard to a magnitude relationship between BLEI and AlEI, BLEI/AlEI is preferably 0.9 or less, and more preferably 0.8 or less. The absolute value of emission intensity obtained in analysis by GDS varies because the sensitivity of each element can be optionally set. However, for example, relative differences in emission intensity in a surface and a matrix, caused by a difference between presence densities, are equal to each other. Accordingly, definitions based on a magnification rather than the absolute value of emission intensity are provided in the present disclosure.

4-3. Analysis by Cross-Section Observation

The presence density of a compound at the interface between the electroless Ni—P plating and the aluminum alloy base material can be calculated by observing a cross section after application of the electroless Ni—P plating to the aluminum alloy base material. A part of the compound may be exposed to the surface of the aluminum alloy base material because the orientation of the compound is random although the compound uniformly exists in the aluminum alloy base material. When the compound removal step is applied, the whole of the compound can be removed even if only the part of the compound is exposed to the surface of the aluminum alloy base material. For example, in the zincate step or the like after the removal of the compound, the matrix of the aluminum alloy base material may be dissolved, thereby newly exposing a compound to the surface of the aluminum alloy base material. However, it was found that when the density of a compound present in a region from the surface of the aluminum alloy base material, closer to the interface between the electroless Ni—P plating and the aluminum alloy base material, to a depth of 1 μm in a thickness direction is 20000 particles/mm$^2$ or less, the amount of the compound exposed to the surface of the aluminum alloy base material can be determined to be small in the electroless Ni—P plating step, and thus, the number of plating defects can also be determined to be small. The density of the compounds is preferably 15000 particles/mm$^2$ or less. In addition, the lower limit value of the density of the compound, depending on the composition of the aluminum alloy and production conditions, is around 5000 particles/mm² in the present disclosure.

5. Method for Producing Magnetic Disk Substrate and Magnetic Disk

A method for producing the aluminum alloy magnetic disk substrate according to the present disclosure will now be described. For the aluminum alloy magnetic disk substrate according to the present disclosure, first, a molten metal adjusted to have a predetermined alloy composition is cast and subjected to a step including an optional homogenization treatment stage, a hot-rolling stage, a cold-rolling stage, and an optional annealing stage, thereby producing an aluminum alloy sheet. Then, the aluminum alloy sheet is stamped to have an annular shape to make an annular aluminum alloy sheet, which is subjected to a step including a pressurization flattening annealing stage, a cutting/grinding work stage, and a strain-removing heat treatment stage, thereby producing an aluminum alloy base material for a magnetic disk. Then, the aluminum alloy base material for a magnetic disk is subjected to a step of plating pretreatment, including an alkaline degreasing treatment stage, an acid-etching treatment stage, a desmutting treatment stage, and a zincate treatment stage. Further, a surface of the aluminum alloy base material subjected to the plating pretreatment is subjected to a step of electroless Ni—P plating treatment as undercoat plating treatment to obtain the magnetic disk substrate. Each step will be described in detail below.

5-1. Casting Stage

First, a molten aluminum alloy is prepared by heating and melting according to a usual method to have a predetermined alloy composition range. The molten aluminum alloy prepared in such a manner is cast according to a usual method such as a semi-continuous casting (DC casting) method. A cooling rate in the casting is preferably in a range of 0.1 to 1000° C./s.

5-2. Homogenization Treatment Stage

Then, the cast aluminum alloy is subjected to homogenization treatment, as needed. The conditions of the homogenization treatment are not particularly limited, and, for example, one-stage heat treatment at 500° C. or more for 0.5 hour or more can be used. The upper limit of a heating temperature in the homogenization treatment is not particularly limited, and the upper limit is set at 650° C. because the aluminum alloy at more than 650° C. may be melted.

5-3. Hot-Rolling Stage

The ingot of the aluminum alloy subjected to the homogenization treatment is worked into a sheet material by hot rolling. When the homogenization treatment is performed, a hot-rolling start temperature is preferably set at 300 to 550° C., and a hot-rolling end temperature is preferably set at less than 380° C., and more preferably set at 300° C. or less, in the hot-rolling step. The lower limit of the hot-rolling end temperature is not particularly limited, and the lower limit is set at 100° C. to prevent a trouble such as edge cracking from occurring. In contrast, when the homogenization treatment is not performed, the hot-rolling start temperature is preferably set at less than 380° C., and more preferably set at less than 350° C. The hot-rolling end temperature is not particularly limited, and the lower limit of the hot-rolling end temperature is set at 100° C. to prevent a trouble such as edge cracking from occurring.

5-4. Cold-Rolling Stage

Then, the hot-rolled sheet is worked into a cold-rolled sheet of around 0.45 to 1.8 mm by cold rolling. In such a manner, the hot-rolled sheet is finished to have a required product sheet thickness by the cold rolling. The conditions of the cold-rolling stage are not particularly limited, and may be set depending on required product sheet strength and a required sheet thickness, and rolling reduction is preferably set at 10 to 95%. Before or in the cold rolling, an annealing treatment stage may be included to ensure cold-rolling workability. When the annealing treatment is performed, for example, batch-type annealing is preferably performed under conditions of a temperature of 200° C. or more and less than 380° C., and 0.1 to 10 hours.

5-5. Production of Magnetic Disk Substrate

The aluminum alloy sheet produced as described above is stamped to have an annular shape to prepare an annular aluminum alloy sheet. Then, the annular aluminum alloy sheet is subjected to a pressurization flattening annealing stage at 220 to 450° C. for 30 minutes or more to prepare a flattened disk blank. Then, the flattened disk blank is subjected to a working treatment step including a cutting/grinding work stage and, preferably, a strain-removing heat treatment stage at a temperature of 250 to 400° C. for 5 to 15 minutes in the order mentioned above. In such a manner, an aluminum alloy base material for a magnetic disk is prepared.

Then, the aluminum alloy base material for a magnetic disk is subjected to an alkaline degreasing treatment stage, an acid-etching treatment stage, a desmutting treatment stage, and a zincate treatment stage in the order mentioned above, as plating pretreatment.

In the degreasing treatment stage, degreasing is preferably performed under conditions of a temperature of 40 to 70° C., a treatment time of 3 to 10 minutes, and a concentration of 200 to 800 mL/L by using commercially available AD-68F (manufactured by C. Uyemura & Co., Ltd.) degreasing liquid or the like. In the acid-etching treatment stage, acid-etching is preferably performed under conditions of a temperature 50 to 75° C., a treatment time of 0.5 to 5 minutes, and a concentration of 20 to 100 mL/L by using commercially available AD-107F (manufactured by C. Uyemura & Co., Ltd.) etching liquid or the like. After the acid-etching treatment, desmutting treatment is preferably performed using $HNO_3$ as usual desmutting treatment under conditions of a temperature of 15 to 40° C., a treatment time of 10 to 120 seconds, and a concentration of 10 to 60% when a compound removal step has already been applied. When the compound removal step has not been applied, the compound removal treatment described above may be performed instead of or in addition to the desmutting treatment.

A first zincate treatment stage is preferably performed under conditions of a temperature of 10 to 35° C., a treatment time of 0.1 to 5 minutes, and a concentration of 100 to 500 mL/L by using commercially available AD-301F-3X (manufactured by C. Uyemura & Co., Ltd.) zincate treatment liquid or the like. After the first zincate treatment stage, Zn peeling treatment is preferably performed under conditions of a temperature of 15 to 40° C., a treatment time of 10 to 120 seconds, and a concentration of 10 to 60% by using $HNO_3$. Then, a second zincate treatment stage is performed under the same conditions as those of the first zincate treatment. A surface of the aluminum alloy base material subjected to the second zincate treatment is subjected to an electroless Ni—P plating treatment step as undercoat plating treatment. As the electroless Ni—P plating treatment, plating treatment is preferably performed under conditions of a temperature of 80 to 95° C., a treatment time of 30 to 180 minutes, and a Ni concentration of 3 to 10 g/L by using commercially available NIMUDEN HDX (manufactured by C. Uyemura & Co., Ltd.) plating liquid or the like.

The magnetic disk substrate subjected to the undercoat plating treatment is obtained in the plating pretreatment step and the electroless Ni—P plating treatment step.

6. Production of Magnetic Disk

Finally, the surface of the magnetic disk substrate subjected to the undercoat plating treatment is flattened by polishing, and a magnetic medium including an undercoat layer, a magnetic layer, a protective film, a lubricant layer, and the like is deposited on the surface by sputtering to make a magnetic disk.

EXAMPLES

The present disclosure will be described in more detail below with reference to Examples. However, the present disclosure is not limited thereto.

First, each aluminum alloy with component composition set forth in Table 1 was melted to make a molten aluminum alloy according to a usual method. Then, the molten aluminum alloy was cast by a DC casting method, to produce an ingot. Both surfaces of the ingot were faced in 15 mm, and the ingot was subjected to homogenization treatment at 520° C. for 1 hour. Then, the ingot was hot-rolled at a hot-rolling start temperature of 460° C. and a hot-rolling end temperature of 280° C. to make a hot-rolled sheet having a sheet thickness of 3.0 mm. The hot-rolled sheet was rolled to have a sheet thickness of 0.8 mm by cold rolling (rolling reduction of 73.3%) without being subjected to intermediate annealing, to make a final rolled sheet. The aluminum alloy sheet obtained in such a manner was stamped to have an annular shape having an outer diameter of 96 mm and an inner diameter of 24 mm to produce an annular aluminum alloy sheet.

TABLE 1

| Alloy No. | Component Composition (mass %) | | | | | | | | | | | | | Al + unavoidable impurities |
|---|---|---|---|---|---|---|---|---|---|---|---|---|---|---|
| | Fe | Mn | Cu | Zn | Si | Ni | Mg | Cr | Zr | Ti | B | V | Ti + B + V | |
| A1  | 1.8 | 0.7  | 0.020 | 0.500 | 0.2 | —   | —   | —    | —    | —     | —     | —     | —     | Bal. |
| A2  | 0.4 | 0.7  | 0.020 | 0.500 | —   | —   | —   | —    | —    | —     | —     | —     | —     | Bal. |
| A3  | 3.0 | 0.7  | 0.020 | 0.500 | —   | —   | —   | —    | —    | —     | —     | —     | —     | Bal. |
| A4  | 1.8 | 0.1  | 0.020 | 0.500 | —   | —   | —   | —    | —    | —     | —     | —     | —     | Bal. |
| A5  | 1.8 | 3.0  | 0.020 | 0.500 | —   | —   | —   | —    | —    | —     | —     | —     | —     | Bal. |
| A6  | 1.8 | 0.7  | 0.005 | 0.500 | —   | —   | —   | —    | —    | —     | —     | —     | —     | Bal. |
| A7  | 1.8 | 0.7  | 1.000 | 0.500 | —   | —   | —   | —    | —    | —     | —     | —     | —     | Bal. |
| A8  | 1.8 | 0.7  | 0.020 | 0.005 | —   | —   | —   | —    | —    | —     | —     | —     | —     | Bal. |
| A9  | 1.8 | 0.7  | 0.020 | 1.000 | —   | —   | —   | —    | —    | —     | —     | —     | —     | Bal. |
| A10 | 1.8 | 0.7  | 0.020 | 0.500 | 0.1 | —   | —   | —    | —    | —     | —     | —     | —     | Bal. |
| A11 | 1.8 | 0.7  | 0.020 | 0.500 | 0.4 | —   | —   | —    | —    | —     | —     | —     | —     | Bal. |
| A12 | 1.8 | 0.7  | 0.020 | 0.500 | —   | 0.1 | —   | —    | —    | —     | —     | —     | —     | Bal. |
| A13 | 1.8 | 0.7  | 0.020 | 0.500 | —   | 3.0 | —   | —    | —    | —     | —     | —     | —     | Bal. |
| A14 | 1.8 | 0.7  | 0.020 | 0.500 | —   | —   | 0.1 | —    | —    | —     | —     | —     | —     | Bal. |
| A15 | 1.8 | 0.7  | 0.020 | 0.500 | —   | —   | 6.0 | —    | —    | —     | —     | —     | —     | Bal. |
| A16 | 1.8 | 0.7  | 0.020 | 0.500 | —   | —   | —   | 0.01 | —    | —     | —     | —     | —     | Bal. |
| A17 | 1.8 | 0.7  | 0.020 | 0.500 | —   | —   | —   | 1.00 | —    | —     | —     | —     | —     | Bal. |
| A18 | 1.8 | 0.7  | 0.020 | 0.500 | —   | —   | —   | —    | 0.01 | —     | —     | —     | —     | Bal. |
| A19 | 1.8 | 0.7  | 0.020 | 0.500 | —   | —   | —   | —    | 1.00 | —     | —     | —     | —     | Bal. |
| A20 | 1.8 | 0.7  | 0.020 | 0.500 | —   | —   | —   | —    | —    | 0.002 | 0.002 | 0.001 | 0.005 | Bal. |
| A21 | 1.8 | 0.7  | 0.020 | 0.500 | —   | —   | —   | —    | —    | 0.200 | 0.200 | 0.100 | 0.500 | Bal. |
| A22 | 1.8 | 0.7  | 0.020 | 0.500 | 0.3 | —   | 2.0 | —    | —    | —     | —     | —     | —     | Bal. |
| A23 | 1.8 | 0.7  | 0.020 | 0.500 | —   | 1.0 | —   | —    | 0.10 | —     | —     | —     | —     | Bal. |
| A24 | 1.8 | 0.7  | 0.020 | 0.500 | 0.3 | —   | —   | 0.10 | —    | 0.020 | 0.020 | 0.010 | 0.050 | Bal. |
| A25 | 1.8 | 0.7  | 0.020 | 0.500 | —   | 1.2 | 0.5 | —    | —    | —     | —     | —     | —     | Bal. |
| A26 | 1.8 | 0.7  | 0.020 | 0.500 | 0.2 | —   | —   | 0.10 | 0.20 | —     | —     | —     | —     | Bal. |
| A27 | 1.8 | 0.7  | 0.020 | 0.500 | 0.2 | 0.3 | 1.0 | 0.20 | 0.20 | —     | —     | —     | —     | Bal. |
| A28 | 1.8 | 0.7  | 0.020 | 0.500 | 0.2 | 0.3 | 1.0 | 0.20 | 0.20 | 0.003 | 0.003 | 0.003 | 0.009 | Bal. |
| A29 | 1.3 | 1.0  | 0.500 | 0.800 | —   | —   | —   | —    | —    | —     | —     | —     | —     | Bal. |
| A30 | 2.2 | 2.5  | 0.700 | 0.700 | —   | —   | —   | —    | —    | —     | —     | —     | —     | Bal. |
| B1  | 0.2 | 0.7  | 0.020 | 0.500 | —   | —   | —   | —    | —    | —     | —     | —     | —     | Bal. |
| B2  | 3.5 | 0.7  | 0.020 | 0.500 | —   | —   | —   | —    | —    | —     | —     | —     | —     | Bal. |
| B3  | 1.8 | 0.07 | 0.020 | 0.500 | —   | —   | —   | —    | —    | —     | —     | —     | —     | Bal. |
| B4  | 1.8 | 3.5  | 0.020 | 0.500 | —   | —   | —   | —    | —    | —     | —     | —     | —     | Bal. |
| B5  | 1.8 | 0.7  | 0.002 | 0.500 | —   | —   | —   | —    | —    | —     | —     | —     | —     | Bal. |
| B6  | 1.8 | 0.7  | 1.500 | 0.500 | —   | —   | —   | —    | —    | —     | —     | —     | —     | Bal. |
| B7  | 1.8 | 0.7  | 0.020 | 0.002 | —   | —   | —   | —    | —    | —     | —     | —     | —     | Bal. |
| B8  | 1.8 | 0.7  | 0.020 | 1.500 | —   | —   | —   | —    | —    | —     | —     | —     | —     | Bal. |
| B9  | 1.8 | 0.7  | 0.020 | 0.500 | 0.7 | —   | —   | —    | —    | —     | —     | —     | —     | Bal. |
| B10 | 1.8 | 0.7  | 0.020 | 0.500 | —   | 3.5 | —   | —    | —    | —     | —     | —     | —     | Bal. |
| B11 | 1.8 | 0.7  | 0.020 | 0.500 | —   | —   | 6.2 | —    | —    | —     | —     | —     | —     | Bal. |
| B12 | 1.8 | 0.7  | 0.020 | 0.500 | —   | —   | —   | 1.50 | —    | —     | —     | —     | —     | Bal. |
| B13 | 1.8 | 0.7  | 0.020 | 0.500 | —   | —   | —   | —    | 1.50 | —     | —     | —     | —     | Bal. |
| B14 | 3.3 | 0.7  | 0.020 | 0.500 | 0.3 | —   | 0.3 | —    | —    | —     | —     | —     | —     | Bal. |
| B15 | 3.3 | 0.7  | 1.500 | 0.500 | 0.2 | 0.3 | 1.0 | 0.20 | 0.20 | 0.003 | 0.003 | 0.003 | 0.009 | Bal. |
| B16 | 1.8 | 0.7  | 0.020 | 0.500 | 0.8 | 3.5 | 6.2 | 1.50 | 1.50 | —     | —     | —     | —     | Bal. |
| B17 | 1.8 | 0.7  | 0.020 | 0.500 | 0.8 | —   | —   | 1.50 | —    | —     | —     | —     | —     | Bal. |
| B18 | 1.8 | 4.0  | 0.020 | 0.500 | 0.2 | 0.3 | —   | —    | 0.20 | —     | —     | —     | —     | Bal. |
| B19 | 3.3 | 3.5  | 1.500 | 1.500 | —   | —   | —   | —    | —    | —     | —     | —     | —     | Bal. |

The annular aluminum alloy sheet obtained in such a manner as described above was subjected to pressurization flattening annealing under a pressure of 1.5 MPa at 300° C. for 3 hours to make a disk blank. An end surface of the disk blank was subjected to cutting work, so that the disk blank had an outer diameter of 95 mm and an inner diameter of 25 mm. Further, grinding work in which the surface was ground in 10 μm was performed, and strain-removing heat treatment was performed at 350° C. for 10 minutes.

Then, under conditions set forth in Table 2, a compound removal step was applied to the aluminum alloy base material subjected to the strain-removing heat treatment, and the aluminum alloy base material was subjected to treatment up to electroless Ni—P plating. The detailed conditions of each treatment are as follows. The aluminum alloy base material was degreased with AD-68F (manufactured by C.Uyemura & Co., Ltd.) at 60° C. for 5 min, then etched with AD-107F (manufactured by C. Uyemura & Co., Ltd.) at 65° C. for 3 min, and further desmutted with 30% $HNO_3$ aqueous solution (room temperature) at room temperature for 50 s. Then, zincate treatment of the aluminum alloy base material was performed with a zincate treatment liquid (AD-301F, manufactured by C.Uyemura & Co., Ltd.) at 25° C. for 50 s. After the zincate treatment, a zincate layer was peeled with a 30% $HNO_3$ aqueous solution (room temperature) for 60 s, and zincate treatment was performed again with a zincate treatment liquid (AD-301F, manufactured by C.Uyemura & Co., Ltd.) at 25° C. for 60 s. The aluminum alloy base material, subjected to the second zincate treatment, was electroless plated with Ni—P of 17 μm in thickness using an electroless Ni—P plating treatment liquid (NIMUDEN HDX, manufactured by C.Uyemura & Co., Ltd.) at 90° C. for 150 min. Finally, the aluminum alloy base material was subjected to final polishing (polishing quantity of 4 μm) by a fabric, to make a sample for evaluating a magnetic disk substrate. In step Nos. C1 to C9 and D1 to D8 in Table 2, a compound treatment step was included before an alkaline degreasing treatment stage. In contrast, in step Nos. C10 to C18 and D9 to D17, a compound treatment step was included before a first zincate treatment stage.

TABLE 2

| Step No. | Compound Removal Step HF Concentration g/L | HNO₃ Concentration mass % | Solution Temperature °C | Treatment Time sec | Alkaline Degreasing Treatment Stage | Acid-Etching Treatment Stage | Desmutting Treatment Stage | Compound Removal Step HF Concentration g/L | HNO₃ Concentration mass % | Solution Temperature °C | Treatment Time sec | First Zincate Treatment Stage | Zn Peeling Treatment Stage | Second Zincate Treatment Stage | Electroless Ni—P Plating Treatment Stage |
|---|---|---|---|---|---|---|---|---|---|---|---|---|---|---|---|
| C1 | 40 | 50 | 25 | 20 | ← | ← | ← | None | None | None | None | ← | ← | ← | ← |
| C2 | 10 | 50 | 25 | 20 | ← | ← | ← | None | None | None | None | ← | ← | ← | ← |
| C3 | 80 | 50 | 25 | 20 | ← | ← | ← | None | None | None | None | ← | ← | ← | ← |
| C4 | 40 | 10 | 25 | 20 | ← | ← | ← | None | None | None | None | ← | ← | ← | ← |
| C5 | 40 | 60 | 25 | 20 | ← | ← | ← | None | None | None | None | ← | ← | ← | ← |
| C6 | 40 | 50 | 10 | 20 | ← | ← | ← | None | None | None | None | ← | ← | ← | ← |
| C7 | 40 | 50 | 30 | 20 | ← | ← | ← | None | None | None | None | ← | ← | ← | ← |
| C8 | 40 | 50 | 25 | 5 | ← | ← | ← | None | None | None | None | ← | ← | ← | ← |
| C9 | 40 | 50 | 25 | 60 | ← | ← | ← | None | None | None | None | ← | ← | ← | ← |
| C10 | None | None | None | None | ← | ← | ← | 40 | 50 | 25 | 20 | ← | ← | ← | ← |
| C11 | None | None | None | None | ← | ← | ← | 10 | 50 | 25 | 20 | ← | ← | ← | ← |
| C12 | None | None | None | None | ← | ← | ← | 80 | 50 | 25 | 20 | ← | ← | ← | ← |
| C13 | None | None | None | None | ← | ← | ← | 40 | 10 | 25 | 20 | ← | ← | ← | ← |
| C14 | None | None | None | None | ← | ← | ← | 40 | 60 | 25 | 20 | ← | ← | ← | ← |
| C15 | None | None | None | None | ← | ← | ← | 40 | 50 | 10 | 20 | ← | ← | ← | ← |
| C16 | None | None | None | None | ← | ← | ← | 40 | 50 | 30 | 20 | ← | ← | ← | ← |
| C17 | None | None | None | None | ← | ← | ← | 40 | 50 | 25 | 5 | ← | ← | ← | ← |
| C18 | None | None | None | None | ← | ← | ← | 40 | 50 | 25 | 60 | ← | ← | ← | ← |
| D1 | 5 | 50 | 25 | 20 | ← | ← | ← | None | None | None | None | ← | ← | ← | ← |
| D2 | 100 | 50 | 25 | 20 | ← | ← | ← | None | None | None | None | ← | ← | ← | ← |
| D3 | 40 | 5 | 25 | 20 | ← | ← | ← | None | None | None | None | ← | ← | ← | ← |
| D4 | 40 | 70 | 25 | 20 | ← | ← | ← | None | None | None | None | ← | ← | ← | ← |
| D5 | 40 | 50 | 5 | 20 | ← | ← | ← | None | None | None | None | ← | ← | ← | ← |
| D6 | 40 | 50 | 40 | 20 | ← | ← | ← | None | None | None | None | ← | ← | ← | ← |
| D7 | 40 | 50 | 25 | 2 | ← | ← | ← | None | None | None | None | ← | ← | ← | ← |
| D8 | 40 | 50 | 25 | 70 | ← | ← | ← | None | None | None | None | ← | ← | ← | ← |
| D9 | None | None | None | None | ← | ← | ← | 5 | 50 | 25 | 20 | ← | ← | ← | ← |
| D10 | None | None | None | None | ← | ← | ← | 100 | 50 | 25 | 20 | ← | ← | ← | ← |
| D11 | None | None | None | None | ← | ← | ← | 40 | 5 | 25 | 20 | ← | ← | ← | ← |
| D12 | None | None | None | None | ← | ← | ← | 40 | 70 | 25 | 20 | ← | ← | ← | ← |
| D13 | None | None | None | None | ← | ← | ← | 40 | 50 | 5 | 20 | ← | ← | ← | ← |
| D14 | None | None | None | None | ← | ← | ← | 40 | 50 | 40 | 20 | ← | ← | ← | ← |
| D15 | None | None | None | None | ← | ← | ← | 40 | 50 | 25 | 2 | ← | ← | ← | ← |
| D16 | None | None | None | None | ← | ← | ← | 40 | 50 | 25 | 70 | ← | ← | ← | ← |
| D17 | None | None | None | None | ← | ← | ← | None | None | None | None | ← | ← | ← | ← |

The following evaluations were performed using the sample for evaluation, produced as described above.

Evaluation 1: Measurement of Fe Emission Intensity by GDS

For an interface between electroless Ni—P plating and an aluminum alloy substrate, and the interior of the aluminum alloy base material in the sample for evaluation, Fe emission intensity was measured by GDS (JY5000RF, manufactured by HORIBA) set at a gas pressure of 400 Pa and an output of 30 W for 300 s. The average value of Al emission intensity until a sputtering time of 250 to 300 seconds was calculated from the measured data, and the value of the peak of Fe emission intensity in the range of sputtering time for which 50 to 84% of the value was achieved was read. An average value of values until a sputtering time of 250 to 300 seconds was regarded as the Fe emission intensity in the interior of the aluminum alloy base material. The results are set forth in Tables 3 to 5.

TABLE 3

| | Alloy | Step | Fe Emission Intensity (GDS Analysis) Maximum Value of Interface | Fe Emission Intensity (GDS Analysis) Interior of Aluminum Alloy Base Material | Density of Compound in Interface (particles/mm$^2$) | Plating Smoothness | Fluttering Property |
|---|---|---|---|---|---|---|---|
| Present Disclosure Example 1 | A1 | C1 | 2.63 | 3.76 | 10448 | Excellent | Excellent |
| Present Disclosure Example 2 | A2 | C1 | 0.51 | 0.81 | 2067 | Good | Good |
| Present Disclosure Example 3 | A3 | C1 | 4.34 | 6.20 | 18971 | Good | Excellent |
| Present Disclosure Example 4 | A4 | C1 | 2.50 | 3.78 | 18008 | Excellent | Good |
| Present Disclosure Example 5 | A5 | C1 | 2.62 | 3.75 | 6449 | Good | Excellent |
| Present Disclosure Example 6 | A6 | C1 | 2.60 | 3.72 | 18349 | Good | Good |
| Present Disclosure Example 7 | A7 | C1 | 2.59 | 3.71 | 6777 | Good | Excellent |
| Present Disclosure Example 8 | A8 | C1 | 2.62 | 3.75 | 14773 | Good | Good |
| Present Disclosure Example 9 | A9 | C1 | 2.59 | 3.70 | 6829 | Good | Excellent |
| Present Disclosure Example 10 | A10 | C1 | 2.63 | 3.76 | 11616 | Excellent | Excellent |
| Present Disclosure Example 11 | A11 | C1 | 2.63 | 3.77 | 7097 | Good | Excellent |
| Present Disclosure Example 12 | A12 | C1 | 2.59 | 3.71 | 17838 | Excellent | Excellent |
| Present Disclosure Example 13 | A13 | C1 | 2.61 | 3.74 | 7187 | Good | Excellent |
| Present Disclosure Example 14 | A14 | C1 | 2.61 | 3.74 | 15081 | Excellent | Excellent |
| Present Disclosure Example 15 | A15 | C1 | 2.65 | 3.79 | 14839 | Excellent | Excellent |
| Present Disclosure Example 16 | A16 | C1 | 2.62 | 3.75 | 11563 | Excellent | Excellent |
| Present Disclosure Example 17 | A17 | C1 | 2.62 | 3.75 | 11641 | Excellent | Excellent |
| Present Disclosure Example 18 | A18 | C1 | 2.63 | 3.77 | 17789 | Excellent | Excellent |
| Present Disclosure Example 19 | A19 | C1 | 2.49 | 3.72 | 12988 | Excellent | Excellent |
| Present Disclosure Example 20 | A20 | C1 | 2.61 | 3.74 | 8245 | Excellent | Excellent |

TABLE 3-continued

| | Alloy | Step | Fe Emission Intensity (GDS Analysis) Maximum Value of Interface | Interior of Aluminum Alloy Base Material | Density of Compound in Interface (particles/mm$^2$) | Plating Smoothness | Fluttering Property |
|---|---|---|---|---|---|---|---|
| Present Disclosure Example 21 | A21 | C1 | 2.59 | 3.70 | 13666 | Good | Excellent |
| Present Disclosure Example 22 | A22 | C1 | 2.63 | 3.76 | 9784 | Good | Excellent |
| Present Disclosure Example 23 | A23 | C1 | 2.59 | 3.71 | 15178 | Excellent | Excellent |
| Present Disclosure Example 24 | A24 | C1 | 2.60 | 3.72 | 5783 | Good | Excellent |
| Present Disclosure Example 25 | A25 | C1 | 2.59 | 3.70 | 9538 | Excellent | Excellent |
| Present Disclosure Example 26 | A26 | C1 | 2.59 | 3.70 | 17253 | Good | Excellent |
| Present Disclosure Example 27 | A27 | C1 | 2.61 | 3.74 | 16031 | Good | Excellent |
| Present Disclosure Example 28 | A28 | C1 | 2.62 | 3.75 | 16858 | Good | Excellent |
| Present Disclosure Example 29 | A29 | C1 | 2.00 | 2.86 | 17103 | Excellent | Excellent |
| Present Disclosure Example 30 | A30 | C1 | 3.18 | 4.55 | 18361 | Excellent | Excellent |
| Comparative Example 1 | B1 | C1 | 0.31 | 0.46 | 1630 | Excellent | Poor |
| Comparative Example 2 | B2 | C1 | 4.99 | 7.13 | 19102 | Poor | Excellent |
| Comparative Example 3 | B3 | C1 | 2.61 | 3.73 | 6346 | Excellent | Poor |
| Comparative Example 4 | B4 | C1 | 2.59 | 3.70 | 12200 | Poor | Excellent |
| Comparative Example 5 | B5 | C1 | 2.63 | 3.76 | 12277 | Poor | Poor |
| Comparative Example 6 | B6 | C1 | 2.61 | 3.73 | 6534 | Poor | Excellent |
| Comparative Example 7 | B7 | C1 | 2.65 | 3.79 | 10595 | Poor | Poor |
| Comparative Example 8 | B8 | C1 | 2.60 | 3.72 | 7862 | Poor | Excellent |
| Comparative Example 9 | B9 | C1 | 2.60 | 3.72 | 5141 | Poor | Excellent |
| Comparative Example 10 | B10 | C1 | 2.63 | 3.76 | 6602 | Poor | Excellent |
| Comparative Example 11 | B11 | C1 | — | — | — | — | — |
| Comparative Example 12 | B12 | C1 | 2.67 | 3.82 | 6936 | Poor | Excellent |
| Comparative Example 13 | B13 | C1 | 2.63 | 3.76 | 15508 | Poor | Excellent |
| Comparative Example 14 | B14 | C1 | 4.72 | 6.75 | 18417 | Poor | Excellent |
| Comparative Example 15 | B15 | C1 | 4.21 | 6.73 | 18397 | Poor | Excellent |
| Comparative Example 16 | B16 | C1 | — | — | — | — | — |
| Comparative Example 17 | B17 | C1 | 2.59 | 3.71 | 11857 | Poor | Excellent |
| Comparative Example 18 | B18 | C1 | 2.63 | 3.76 | 16357 | Poor | Excellent |
| Comparative Example 19 | B19 | C1 | 4.69 | 6.71 | 18414 | Poor | Excellent |

TABLE 4

| | Alloy | Step | Fe Emission Intensity (GDS Analysis) Maximum Value of Interface | Fe Emission Intensity (GDS Analysis) Interior of Aluminum Alloy Base Material | Density of Compound in Interface (particles/mm²) | Plating Smoothness | Fluttering Property |
|---|---|---|---|---|---|---|---|
| Present Disclosure Example 31 | A1 | C10 | 2.64 | 3.73 | 12127 | Excellent | Excellent |
| Present Disclosure Example 32 | A2 | C10 | 0.51 | 0.79 | 2483 | Good | Good |
| Present Disclosure Example 33 | A3 | C10 | 2.60 | 6.04 | 11493 | Good | Excellent |
| Present Disclosure Example 34 | A4 | C10 | 2.58 | 3.81 | 13332 | Excellent | Good |
| Present Disclosure Example 35 | A5 | C10 | 2.66 | 3.75 | 8434 | Good | Excellent |
| Present Disclosure Example 36 | A6 | C10 | 2.65 | 3.80 | 12564 | Good | Good |
| Present Disclosure Example 37 | A7 | C10 | 2.67 | 3.77 | 15793 | Good | Excellent |
| Present Disclosure Example 38 | A8 | C10 | 2.59 | 3.75 | 7150 | Good | Good |
| Present Disclosure Example 39 | A9 | C10 | 2.59 | 3.71 | 7728 | Good | Excellent |
| Present Disclosure Example 40 | A10 | C10 | 2.61 | 3.73 | 6619 | Excellent | Excellent |
| Present Disclosure Example 41 | A11 | C10 | 2.63 | 3.69 | 9597 | Good | Excellent |
| Present Disclosure Example 42 | A12 | C10 | 2.61 | 3.72 | 14365 | Excellent | Excellent |
| Present Disclosure Example 43 | A13 | C10 | 2.63 | 3.73 | 10541 | Good | Excellent |
| Present Disclosure Example 44 | A14 | C10 | 2.64 | 3.77 | 17853 | Excellent | Excellent |
| Present Disclosure Example 45 | A15 | C10 | 2.59 | 3.80 | 11968 | Excellent | Excellent |
| Present Disclosure Example 46 | A16 | C10 | 2.66 | 3.74 | 13443 | Excellent | Excellent |
| Present Disclosure Example 47 | A17 | C10 | 2.62 | 3.69 | 14347 | Excellent | Excellent |
| Present Disclosure Example 48 | A18 | C10 | 2.66 | 3.72 | 18849 | Excellent | Excellent |
| Present Disclosure Example 49 | A19 | C10 | 2.63 | 3.82 | 17179 | Excellent | Excellent |
| Present Disclosure Example 50 | A20 | C10 | 2.62 | 3.78 | 13433 | Excellent | Excellent |
| Present Disclosure Example 51 | A21 | C10 | 2.59 | 3.70 | 12042 | Good | Excellent |
| Present Disclosure Example 52 | A22 | C10 | 2.61 | 3.76 | 15177 | Good | Excellent |
| Present Disclosure Example 53 | A23 | C10 | 2.58 | 3.82 | 10240 | Excellent | Excellent |
| Present Disclosure Example 54 | A24 | C10 | 2.60 | 3.71 | 5565 | Good | Excellent |

TABLE 4-continued

| | Alloy | Step | Fe Emission Intensity (GDS Analysis) Maximum Value of Interface | Fe Emission Intensity (GDS Analysis) Interior of Aluminum Alloy Base Material | Density of Compound in Interface (particles/mm²) | Plating Smoothness | Fluttering Property |
|---|---|---|---|---|---|---|---|
| Present Disclosure Example 55 | A25 | C10 | 2.61 | 3.73 | 6488 | Excellent | Excellent |
| Present Disclosure Example 56 | A26 | C10 | 2.63 | 3.77 | 10831 | Good | Excellent |
| Present Disclosure Example 57 | A27 | C10 | 2.66 | 3.76 | 8942 | Good | Excellent |
| Present Disclosure Example 58 | A28 | C10 | 2.64 | 3.72 | 15345 | Good | Excellent |
| Present Disclosure Example 59 | A29 | C10 | 2.13 | 2.94 | 5583 | Excellent | Excellent |
| Present Disclosure Example 60 | A30 | C10 | 3.67 | 4.72 | 18439 | Excellent | Excellent |
| Comparative Example 20 | B1 | C10 | 0.43 | 0.52 | 2010 | Excellent | Poor |
| Comparative Example 21 | B2 | C10 | 5.24 | 7.12 | 10827 | Poor | Excellent |
| Comparative Example 22 | B3 | C10 | 2.66 | 3.79 | 6702 | Excellent | Poor |
| Comparative Example 23 | B4 | C10 | 2.63 | 3.82 | 10123 | Poor | Excellent |
| Comparative Example 24 | B5 | C10 | 2.58 | 3.70 | 19699 | Poor | Poor |
| Comparative Example 25 | B6 | C10 | 2.62 | 3.76 | 6801 | Poor | Excellent |
| Comparative Example 26 | B7 | C10 | 2.66 | 3.69 | 7934 | Poor | Poor |
| Comparative Example 27 | B8 | C10 | 2.59 | 3.75 | 5530 | Poor | Excellent |
| Comparative Example 28 | B9 | C10 | 2.63 | 3.70 | 17150 | Poor | Excellent |
| Comparative Example 29 | B10 | C10 | 2.64 | 3.81 | 4571 | Poor | Excellent |
| Comparative Example 30 | B11 | — | — | — | — | — | Excellent |
| Comparative Example 31 | B12 | C10 | 2.63 | 3.76 | 5855 | Poor | Excellent |
| Comparative Example 32 | B13 | C10 | 2.60 | 3.76 | 17292 | Poor | Excellent |
| Comparative Example 33 | B14 | C10 | 4.53 | 6.64 | 13517 | Poor | Excellent |
| Comparative Example 34 | B15 | C10 | 5.04 | 6.70 | 17223 | Poor | Excellent |
| Comparative Example 35 | B16 | C10 | — | — | — | — | — |
| Comparative Example 36 | B17 | C10 | 2.59 | 3.68 | 7965 | Poor | Excellent |
| Comparative Example 37 | B18 | C10 | 2.63 | 3.78 | 18652 | Poor | Excellent |
| Comparative Example 38 | B19 | C10 | 4.68 | 6.34 | 14200 | Poor | Excellent |

TABLE 5

| | Alloy | Step | Fe Emission Intensity (GDS Analysis) Maximum Value of Interface | Fe Emission Intensity (GDS Analysis) Interior of Aluminum Alloy Base Material | Density of Compound in Interface (particles/mm²) | Plating Smoothness | Fluttering Property |
|---|---|---|---|---|---|---|---|
| Present Disclosure Example 61 | A1 | C2 | 3.12 | 3.75 | 16204 | Excellent | Excellent |
| Present Disclosure Example 62 | A1 | C3 | 3.10 | 3.72 | 4323 | Good | Excellent |
| Present Disclosure Example 63 | A1 | C4 | 3.20 | 3.71 | 15400 | Excellent | Excellent |
| Present Disclosure Example 64 | A1 | C5 | 3.15 | 3.71 | 9403 | Excellent | Excellent |
| Present Disclosure Example 65 | A1 | C6 | 3.22 | 3.72 | 17255 | Good | Excellent |
| Present Disclosure Example 66 | A1 | C7 | 2.51 | 3.70 | 11933 | Good | Excellent |
| Present Disclosure Example 67 | A1 | C8 | 2.84 | 3.70 | 19597 | Good | Excellent |
| Present Disclosure Example 68 | A1 | C9 | 2.98 | 3.70 | 4202 | Excellent | Excellent |
| Present Disclosure Example 69 | A1 | C11 | 3.02 | 3.71 | 17855 | Excellent | Excellent |
| Present Disclosure Example 70 | A1 | C12 | 2.46 | 3.72 | 4110 | Good | Excellent |
| Present Disclosure Example 71 | A1 | C13 | 3.15 | 3.76 | 12744 | Excellent | Excellent |
| Present Disclosure Example 72 | A1 | C14 | 3.10 | 3.74 | 9718 | Excellent | Excellent |
| Present Disclosure Example 73 | A1 | C15 | 3.20 | 3.74 | 15384 | Good | Excellent |
| Present Disclosure Example 74 | A1 | C16 | 2.64 | 3.72 | 7257 | Good | Excellent |
| Present Disclosure Example 75 | A1 | C17 | 3.20 | 3.72 | 17296 | Good | Excellent |
| Present Disclosure Example 76 | A1 | C18 | 2.94 | 3.72 | 8057 | Excellent | Excellent |
| Comparative Example 39 | A1 | D1 | 3.94 | 3.71 | 27242 | Poor | Excellent |
| Comparative Example 40 | A1 | D2 | 2.94 | 3.73 | 4042 | Poor | Excellent |
| Comparative Example 41 | A1 | D3 | 4.12 | 3.70 | 23929 | Poor | Excellent |
| Comparative Example 42 | A1 | D4 | 3.17 | 3.76 | 14570 | Poor | Excellent |
| Comparative Example 43 | A1 | D5 | 4.21 | 3.78 | 25647 | Poor | Excellent |
| Comparative Example 44 | A1 | D6 | 2.67 | 3.75 | 6799 | Poor | Excellent |
| Comparative Example 45 | A1 | D7 | 4.30 | 3.72 | 26497 | Poor | Excellent |
| Comparative Example 46 | A1 | D8 | 2.84 | 3.71 | 7829 | Poor | Excellent |
| Comparative Example 47 | A1 | D9 | 4.20 | 3.75 | 29214 | Poor | Excellent |
| Comparative Example 48 | A1 | D10 | 3.14 | 3.75 | 4610 | Poor | Excellent |
| Comparative Example 49 | A1 | D11 | 3.96 | 3.77 | 26384 | Poor | Excellent |
| Comparative Example 50 | A1 | D12 | 2.60 | 3.72 | 12650 | Poor | Excellent |

TABLE 5-continued

| | Alloy | Step | Fe Emission Intensity (GDS Analysis) Maximum Value of Interface | Fe Emission Intensity (GDS Analysis) Interior of Aluminum Alloy Base Material | Density of Compound in Interface (particles/mm$^2$) | Plating Smoothness | Fluttering Property |
|---|---|---|---|---|---|---|---|
| Comparative Example 51 | A1 | D13 | 4.03 | 3.70 | 26540 | Poor | Excellent |
| Comparative Example 52 | A1 | D14 | 3.00 | 3.70 | 4126 | Poor | Excellent |
| Comparative Example 53 | A1 | D15 | 4.30 | 3.74 | 28482 | Poor | Excellent |
| Comparative Example 54 | A1 | D16 | 2.86 | 3.71 | 10452 | Poor | Excellent |
| Comparative Example 55 | A1 | D17 | 4.53 | 3.71 | 28647 | Poor | Excellent |

Evaluation 2: Measurement of Density of Compound at Interface by Cross-Section Observation The sample for evaluation was embedded into a resin to produce a resin sample for cross-section observation. The resin sample was mirror-polished to obtain a cross-section observation sample. Ten visual fields of a composition image at a magnification of 5000 times of the interface between the electroless Ni—P plating and the aluminum alloy base material were photographed by an SEM. Specifically, the number of the particles of a compound existing in a region from the surface of the aluminum alloy base material, closer to the interface between the electroless Ni—P plating and the aluminum alloy substrate, to a depth of 1 μm in a thickness direction was measured and converted into the number per mm$^2$. The arithmetic mean value of 10 visual fields is set forth in in Tables 3 to 5.

Evaluation 3: Plating Smoothness

The sample for evaluation was immersed in 50% by volume of nitric acid at 50° C. for 3 minutes to etch the Ni—P plated surface. Five visual fields of the etched Ni—P plated surface were photographed using an SEM at a magnification of 5000 times. The area of one visual field was set at 536 μm$^2$. The numbers of plating defects were measured based on images obtained by photographing the five visual fields, and the arithmetic mean value of the five visual fields was determined. A case in which the arithmetic mean value was less than 5 per visual field was evaluated as "Excellent", a case in which the arithmetic mean value was 5 or more and less than 10 per visual field was evaluated as "Good", and a case in which the arithmetic mean value was 10 or more per visual field was evaluated as "Poor". "Excellent" and "Good" were regarded as acceptable, while "Poor" was regarded as unacceptable. The results are set forth in Tables 3 to 5.

Evaluation 4: Fluttering Property

Measurement was performed by placing the sample for evaluation on a commercially available hard disk drive in the presence of air. ST2000 (trade name) manufactured by Seagate was used as the hard disk drive, and a motor to which SLD102 (trade name) manufactured by Techno Alive Co. was directly connected was driven. Plural disks at a rotation number set at 7200 rpm were always placed, and the vibrations of a surface of the top magnetic disk of the disks were observed with LDV1800 (trade name), as a laser Doppler meter, manufactured by ONO SOKKI CO., LTD. The observed vibrations were subjected to spectrum analysis with an FFT analysis apparatus DS3200 (trade name) manufactured by ONO SOKKI CO., LTD. The observation was performed by observing the disk surface through a hole opened in the lid of the hard disk drive. In addition, a squeeze plate placed in the commercially available hard disk was removed, and the evaluation was performed. A fluttering characteristic was evaluated with the maximum displacement (disk fluttering (nm)) of a broad peak in the vicinity of 300 Hz to 1500 Hz at which fluttering appears. Such a broad peak, referred to as non-repeatable run out (NRRO), has been found to greatly influence the positioning error of a head. In air, a fluttering characteristic of 30 nm or less was evaluated as "Excellent", a fluttering characteristic of more than 30 nm and 50 nm or less was evaluated as "Good", and a fluttering characteristic of more than 50 nm was evaluated as "Poor". "Excellent" and "Good" were regarded as acceptable, while "Poor" was regarded as unacceptable. The results are set forth in Tables 3 to 5.

Present Disclosure Examples 1 to 60 and Comparative Examples 1 to 38 are Examples with the varying compositions of aluminum alloys, while Present Disclosure Examples 61 to 76 and Comparative Examples 39 to 55 are Examples with varying steps of treatment of aluminum alloy base materials.

In Present Disclosure Examples 1 to 76, the evaluation results of plating smoothness and a fluttering property were acceptable because the alloy composition and the conditions of the compound removal step were within the scope of the present disclosure.

In Comparative Example 1 and Comparative Example 20, the number of second phase particles was small because of the small content of Fe, and a fluttering property was unacceptable.

In Comparative Example 2 and Comparative Example 21, the amount of coarse Al—Fe-based compound was large because of the large content of Fe. Although the coarse Al—Fe-based compound was removed in a compound removal step, holes formed after the removal became plating defects. Thus, plating smoothness was unacceptable.

In Comparative Example 3 and Comparative Example 22, the number of second phase particles was small because of the small content of Mn, and a fluttering property was unacceptable.

In Comparative Example 4 and Comparative Example 23, the amount of coarse Al—Mn-based compound was large because of the large content of Mn. Although the coarse Al—Mn-based compound was removed in a compound removal step, holes formed after the removal became plating defects. Thus, plating smoothness was unacceptable.

In Comparative Example 5 and Comparative Example 24, the number of second phase particles was small because of the small content of Cu, and a fluttering property was unacceptable. In addition, a zincate coating film was non-uniform, defects were generated on a plated surface, and plating smoothness was unacceptable.

In Comparative Example 6 and Comparative Example 25, the amount of coarse Al—Cu-based compound was large because of the large content of Cu. Although the coarse Al—Cu-based compound was removed in a compound removal step, holes formed after the removal became plating defects. Thus, plating smoothness was unacceptable.

In Comparative Example 7 and Comparative Example 26, the number of second phase particles was small because of the small content of Zn, and a fluttering property was unacceptable. In addition, a zincate coating film was non-uniform, defects were generated on a plated surface, and plating smoothness was unacceptable.

In Comparative Example 8 and Comparative Example 27, the potential of a matrix was too electronegative because of the large content of Zn, and therefore, the matrix was intensively dissolved in each step of plating treatment, thereby generating a large number of recesses and projections. Therefore, defects were generated on a plated surface, and plating smoothness was unacceptable.

In Comparative Example 9 and Comparative Example 28, the number of coarse Si particles was large because of the large content of Si, and it was impossible to remove the coarse Si particles even if a compound removal step was applied. Therefore, defects on a plated surface were generated, and plating smoothness was unacceptable.

In Comparative Example 10 and Comparative Example 29, the amount of coarse Al—Ni-based compound was large because of the large content of Ni. Although the coarse Al—Ni-based compound was removed in a compound removal step, holes formed after the removal became plating defects. Thus, plating smoothness was unacceptable.

In Comparative Example 11 and Comparative Example 30, rolling was impossible because of the large content of Mg, and it was impossible to obtain a sample for evaluation.

In Comparative Example 12 and Comparative Example 31, the amount of coarse Al—Cr-based compound was large because of the large content of Cr. Although the coarse Al—Cr-based compound was removed in a compound removal step, holes formed after the removal became plating defects. Thus, plating smoothness was unacceptable.

In Comparative Example 13 and Comparative Example 32, the amount of coarse Al—Zr-based compound was large because of the large content of Zr. Although the coarse Al—Zr-based compound was removed in a compound removal step, holes formed after the removal became plating defects. Thus, plating smoothness was unacceptable.

In Comparative Example 14 and Comparative Example 33, the amount of coarse Al—Fe-based compound was large because of the large content of Fe. Although the coarse Al—Fe-based compound was removed in a compound removal step, holes formed after the removal became plating defects. Thus, plating smoothness was unacceptable.

In Comparative Example 15 and Comparative Example 34, the amount of coarse Al—Fe-based compound was large because of the large contents of Fe and Cu. Although the coarse Al—Fe-based compound was removed in a compound removal step, holes formed after the removal became plating defects. Thus, plating smoothness was unacceptable.

In Comparative Example 16 and Comparative Example 35, rolling was impossible because of the large content of Mg (the contents of Si, Ni, Cr, and Zr were also large), and it was impossible to obtain a sample for evaluation.

In Comparative Example 17 and Comparative Example 36, the amount of coarse Al—Fe-based compound was large because of the large contents of Si and Cr. Although the coarse Al—Fe-based compound was removed in a compound removal step, holes formed after the removal became plating defects. Thus, plating smoothness was unacceptable.

In Comparative Example 18 and Comparative Example 37, the amount of coarse Al—Mn-based compound was large because of the large content of Mn. Although the coarse Al—Mn-based compound was removed in a compound removal step, holes formed after the removal became plating defects. Thus, plating smoothness was unacceptable.

In Comparative Example 19 and Comparative Example 38, the amount of coarse Al—Mn-based compound was large because of the large contents of Fe, Mn, and Cu. Although the coarse Al—Mn-based compound was removed in a compound removal step, holes formed after the removal became plating defects. Thus, plating smoothness was unacceptable. In addition, the potential of a matrix was too electronegative because the content of Zn was also large, and therefore, the matrix was intensively dissolved in each step of plating treatment, thereby generating a large number of recesses and projections. Therefore, defects were generated on a plated surface, and the plating smoothness was unacceptable.

In Comparative Example 39 and Comparative Example 47, a compound was not sufficiently removed because of the low concentration of I-IF in a chemical liquid used in a compound removal step, defects on a plated surface were generated, and plating smoothness was unacceptable.

In Comparative Example 40 and Comparative Example 48, a substrate was intensively dissolved, thereby generating a large number of recesses and projections, because of the too high concentration of I-IF in a chemical liquid used in a compound removal step. Therefore, defects were generated on a plated surface, and plating smoothness was unacceptable.

In Comparative Example 41 and Comparative Example 49, a compound was not sufficiently removed because of the low concentration of $HNO_3$ in a chemical liquid used in a compound removal step, defects on a plated surface were generated, and plating smoothness was unacceptable.

In Comparative Example 42 and Comparative Example 50, a compound was not sufficiently removed because of the too high concentration of $HNO_3$ in a chemical liquid used in a compound removal step, defects on a plated surface were generated, and plating smoothness was unacceptable.

In Comparative Example 43 and Comparative Example 51, a reaction rate was low because of the low temperature of a chemical liquid used in a compound removal step, a compound was not sufficiently removed, defects on a plated surface were generated, and plating smoothness was unacceptable.

In Comparative Example 44 and Comparative Example 52, a reaction rate was high, and a substrate was intensively dissolved, thereby generating a large number of recesses and projections, because of the high temperature of a chemical liquid used in a compound removal step. Therefore, plating smoothness was unacceptable.

In Comparative Example 45 and Comparative Example 53, reaction time is insufficient because of the short time of a compound removal step, a compound was not sufficiently removed, defects on a plated surface were generated, and plating smoothness was unacceptable.

In Comparative Example 46 and Comparative Example 54, reaction excessively proceeded, thereby intensively dissolving a substrate and generating a large number of recesses and projections, because of the long time of a compound removal step. Therefore, plating smoothness was unacceptable.

In Comparative Example 55, because of a conventional electroless Ni—P plating step to which a compound removal step was not applied, a compound was not sufficiently removed, defects on a plated surface were generated, and plating smoothness was unacceptable.

INDUSTRIAL APPLICABILITY

A magnetic disk that enables the number of such placed magnetic disks to be increased due to thinning of the magnetic disk, enables a storage capacity per magnetic disk to be increased, and contributes to the higher capacity of an HDD is provided by providing an aluminum alloy magnetic disk substrate having features of reduced disk flutter and decreased defects on an electroless Ni—P plated surface.

The invention claimed is:

1. An aluminum alloy magnetic disk substrate comprising: an aluminum alloy base material comprising an aluminum alloy containing 0.4 to 3.0 mass % of Fe, 0.1 to 3.0 mass % of Mn, 0.005 to 1.000 mass % of Cu, and 0.005 to 1.000 mass % of Zn, with a balance of Al and unavoidable impurities; and an electroless Ni—P plated layer formed on a surface of the aluminum alloy base material, wherein a maximum value (BLEI) of Fe emission intensity in a range of 50 to 84% of Al emission intensity in an interior of the aluminum alloy base material, at an interface between the electroless Ni—P plated layer and the aluminum alloy base material, as determined by a glow discharge optical emission spectrometry device, is lower than Fe emission intensity (AIEI) in the aluminum alloy base material, as determined by the glow discharge optical emission spectrometry device.

2. The aluminum alloy magnetic disk substrate according to claim 1, wherein BLEI/AIEI is 0.9 or less in a relationship between BLEI and AIEI.

3. The aluminum alloy magnetic disk substrate according to claim 1, wherein a density of a compound present in a region from a surface, closer to the interface, of the aluminum alloy base material to a depth of 1 μm in a thickness direction is 20000 particles/mm$^2$ or less.

4. The aluminum alloy magnetic disk substrate according to claim 1, wherein the aluminum alloy further comprises one or more selected from 0.1 to 0.4 mass % of Si, 0.1 to 3.0 mass % of Ni, 0.1 to 6.0 mass % of Mg, 0.01 to 1.00 mass % of Cr, and 0.01 to 1.00 mass % of Zr.

5. The aluminum alloy magnetic disk substrate according to claim 1, wherein the aluminum alloy further comprises one or more selected from Ti, B, and V, of which a total content is 0.005 to 0.500 mass %.

6. A method for producing the aluminum alloy magnetic disk substrate according to claim 1, the method comprising: a step of preparing an aluminum alloy sheet, comprising subjecting the aluminum alloy to a casting stage, a hot-rolling stage, and a cold-rolling stage in an order mentioned above; a step of preparing the aluminum alloy base material, comprising subjecting an annular aluminum alloy sheet obtained by stamping the aluminum alloy sheet to have an annular shape to a pressurization flattening annealing stage, a cutting/grinding work stage, and a strain-removing heat treatment stage in an order mentioned above; a plating pretreatment step comprising subjecting the aluminum alloy base material to an alkaline degreasing treatment stage, an acid-etching treatment stage, a desmutting treatment stage, and a zincate treatment stage in an order mentioned above; and an electroless Ni—P plating treatment step of performing electroless Ni—P plating treatment of a surface of the aluminum alloy base material subjected to the plating pretreatment step, wherein the method for producing the aluminum alloy magnetic disk substrate further comprises a compound removal step of performing immersion for 5 to 60 seconds in a mixed solution of $HNO_3$/HF that is 10 to 60 mass % $HNO_3$ solution at 10 to 30° C. and contains 10 to 80 g/L of HF, after the cutting/grinding work stage and before the zincate treatment stage.

7. The method for producing the aluminum alloy magnetic disk substrate according to claim 6, the method further comprising either or both of a homogenization treatment stage between the casting stage and the hot-rolling stage and an annealing treatment stage before or in the cold-rolling stage.

* * * * *